United States Patent [19]
Dickson et al.

[11] Patent Number: 5,692,859
[45] Date of Patent: Dec. 2, 1997

[54] CABLE HANDLING SYSTEM

[75] Inventors: James Dickson, Glasgow; James Alistair Stanley Anderson, Cove; Alun Smith, Hamilton, all of United Kingdom

[73] Assignee: Dowty Boulton Paul Limited, Wolverhampton, United Kingdom

[21] Appl. No.: 527,602

[22] Filed: Sep. 13, 1995

[30] Foreign Application Priority Data

Sep. 14, 1994 [GB] United Kingdom ............... 9418469

[51] Int. Cl.⁶ ................................................... F16L 1/04
[52] U.S. Cl. .................... 405/168.4; 405/158; 405/166
[58] Field of Search .......................... 405/168.3, 168.4, 405/165, 166–173, 158

[56] References Cited

U.S. PATENT DOCUMENTS

| | | | |
|---|---|---|---|
| 3,372,461 | 3/1968 | Tesson | 405/168.3 X |
| 3,685,306 | 8/1972 | Mott | 405/168.3 |
| 3,881,647 | 5/1975 | Wolfe | |
| 4,039,109 | 8/1977 | Rhodes | |
| 4,817,845 | 4/1989 | Franchuk | |
| 4,917,540 | 4/1990 | Recalde | 405/168.4 X |
| 5,348,423 | 9/1994 | Maloberti et al. | 405/168.4 X |
| 5,368,212 | 11/1994 | Koch | |

FOREIGN PATENT DOCUMENTS

| | | |
|---|---|---|
| 0 084 080 | 7/1983 | European Pat. Off. |
| 2 259 493 | 3/1993 | United Kingdom |

*Primary Examiner*—Dennis L. Taylor
*Attorney, Agent, or Firm*—Ratner & Prestia

[57] ABSTRACT

A linear cable laying engine has a pair of endless belts (12,14) having a substantial length (16,18) in respective face to face opposition, and means for applying force to the belts to cause them to grip a cable (42) between the opposed faces.

14 Claims, 4 Drawing Sheets

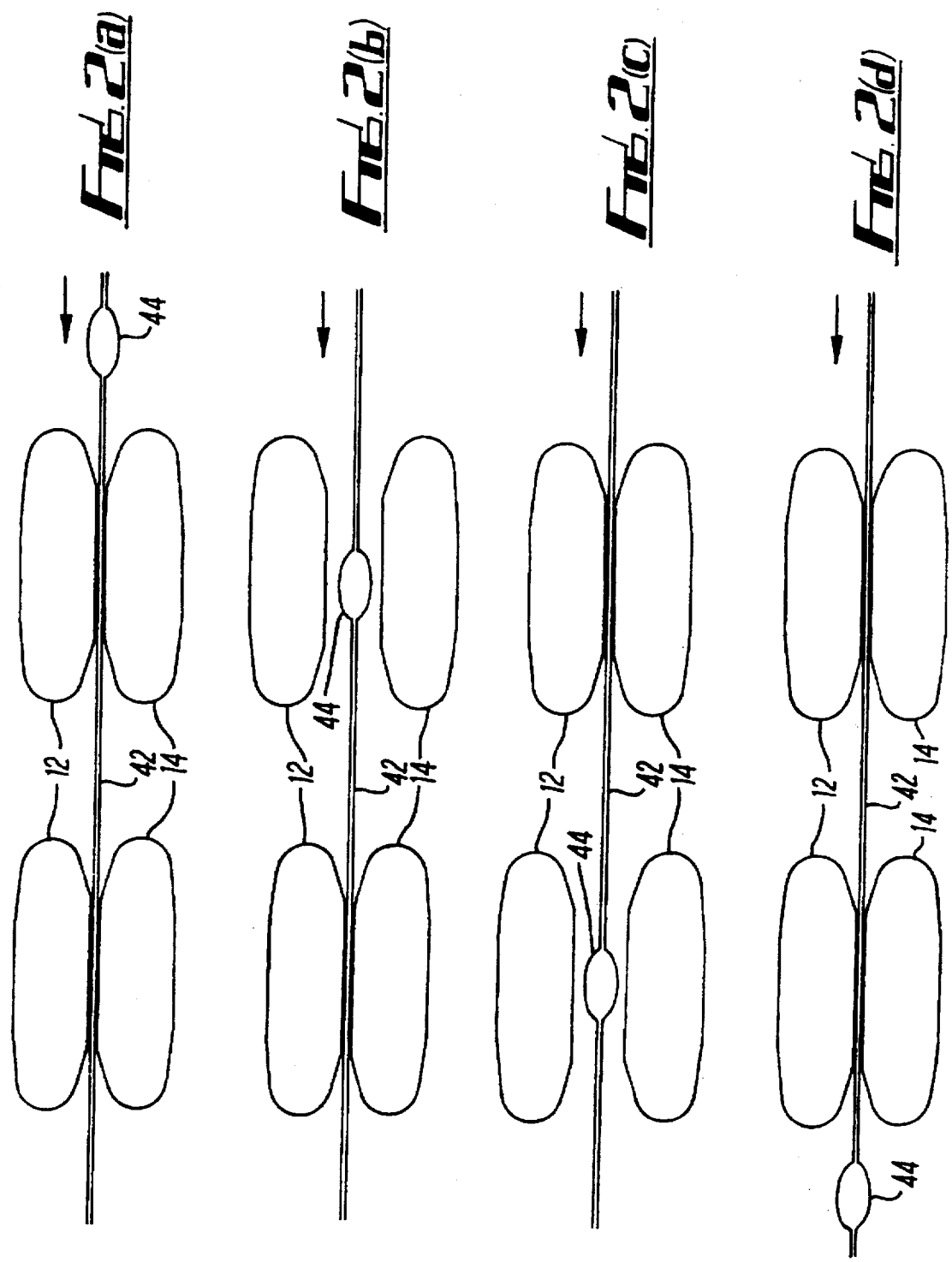

CABLE HANDLING SYSTEM

This invention relates to a cable handling system, and more especially to a system for laying or retrieving undersea cables.

Undersea cables are stored on board ship in dedicated tanks, and are lowered over either the bow or stern of the ship via a cable engine. Depending on the depth of water, and the forward speed of the ship, the cable engine either pushes cable out of the ship, or performs a hold back duty to stop it running away overboard.

Recent changes in the construction of undersea cables, especially the use of optical fibres in place of copper, have resulted in cables having smaller diameters and increased unrepeatered lengths.

Existing equipment is often ship-specific and not interchangeable or flexible, so that a major change of cable diameter often forces a change of laying system. Further, repeaters in their relatively bulky housings can only be laid during a period of much reduced speed of travel of the laying vessel.

Cable engines of various types are known and may be categorised as wheeled pair linear engines, drum engines and tracked engines.

A wheeled pair linear engine generally comprises of horizontally or vertically opposed pairs of tired wheels in a linear configuration. The number of pairs configured together typically varies from one to many tens.

Each tire pair is squeezed together by an hydraulic cylinder, and is driven by either electric or hydraulic means. Cable is passed linearly between the pairs of wheels and the motors used to push out or hold back the cable as appropriate.

The machine is principally designed for cable diameters of 40 mm and above. Smaller cable can be handled but with diminishing efficiency until the machine is impractical at approximately 15 mm diameter cable and below. The tired machine is specifically designed to pass repeaters at low speed but without stopping the engine.

A drum engine system is a capstan machine where outboard cable tension is reacted by several wraps of cable (usually 3 or 4) around the drum and then cable is passed to a small back tensioning machine. The machine is designed to generate large cable tensions of approximately 40 tonnes and was developed originally for repair duties together with large diameter heavy cable. It can be used for laying small diameter cable together with repeaters. However, handling repeaters is not a straight forward operation and involves a complicated procedure at very low speeds. Drum engines are usually bulky assemblies having a typical diameter of 3–5 meters.

Tracked engines are tracked machines comprising caterpillar type slats in a looped arrangement and disposed in opposing pairs to give a linear interface to grip the cable. Several tracked pairs are usually arranged linearly in order to achieve the necessary grip. Each track consists of individual links, pin joined together to provide an endless chain. Each link carries a soft pad, independent of the next. Due to the high mass and discontinuous nature of a tracked drive the machine is non suitable for high speed laying of cable without excessive noise and vibration. Operating speeds currently used are in the region of 6 knots maximum with tracked machines.

In addition to the above cable engines, ship installations may employ small machines known as transporters for moving cable around the ship, or loading when in port. Generally they are wheeled or tracked in design. However, occasionally these machines have endless flexible belts arranged in a single opposing pair. These belts perform in a low tension hauling mode only.

According to a first aspect of the present invention there is provided a linear cable laying engine comprising a pair of endless belts having a substantial length in respective face to face opposition, and means for applying force to the belts to cause them to grip a cable between the opposed faces.

Preferably the linear cable laying engine is modular, a linear cable laying system being provided by employing a plurality of the linear cable laying engines in series.

Preferably, the means includes one or more hydraulic cylinders arranged to apply force to the belts.

Each linear cable laying engine preferably includes a base frame. Preferably the base frame is a standard container having standard attachment to a ship's deck. Optionally the base frame conforms to ISO container dimensions.

Preferably each base frame also contains an hydraulic power pack to supply hydraulic power, and electric drive means to drive the belts.

Preferably, the linear cable laying engine further comprises a pivotal support means for at least one endless belt whereby the at least one belt can pivot to form a tapering aperture between the opposed lengths of belt. Preferably both endless belts are provided with pivotal support means. Additionally the belts may be provided with transverse movement means.

By this, in operation, when a repeater housing on a cable enters a linear cable engine at one end, the endless belts may pivot so that at that end the opposed faces part to allow the repeater to enter the gap. As the repeater moves along the engine, the transverse movement means and pivot means operate so that the belts move apart with the opposed faces being again parallel and now spaced at a greater distance. As the repeater moves to the other end of the cable engine, the opposed faces pivot relatively in the opposite direction to allow the repeater to pass out of the engine while the belts once again grip the cable.

Alternatively there is provided a plurality of modular linear cable laying engines, wherein in each one or more of the endless belts may be supplied with transverse movement means so that the spacing between the opposed lengths can be varied.

With this arrangement one or more of the modules of the cable laying system can grip the cable while another one of the modules can release the cable, specifically by opening a gap between the opposed belt faces through transverse movement of the belts, so as to allow a repeater housing to pass through the respective module of the machine without impedance or obstruction. When the repeater has passed through a specific module, the belts of that module my close, thereby maintaining a grip on the cable, while the belts of an adjacent module move relatively and transversely apart, thereby enabling the unobstructed continuing movement of the repeater through the system.

Optionally there is provided a plurality of modular linear cable engines arranged to operate on a cable in series; and control means to a control the hydraulic and electric power supplied to each engine so as to balance the loading applied to each. In practice, two or three engines may be used in series, depending on cable thickness and the speed of cable laying or retrieval.

Preferably the control means is supplied on a base frame, preferably to ISO container dimensions, so as to provide a modular control cabin.

According to a second aspect of the invention, a linear cable laying engine comprises a pair of endless belts having a substantial length in respective face to face opposition; at least one hydraulic cylinder arranged to apply force to the belts so as to grip a cable between the opposed faces; and a vector drive control system arranged to provide braking power to the endless belts in accordance with the speed of movement of the vessel and the required cable laying speed.

Preferably the vector drive control system is arranged to regenerate power during the braking mode and is connected to a plurality of resistors to which such regenerated power is supplied. The resistors may be water-cooled.

Optionally the vector drive control system and the plurality of resistors are supplied on a base frame, preferably to ISO container dimensions, so as to provide a modular vector drive system.

According to a third aspect of the invention a modular cable laying system comprises at least one modular linear cable laying engine; a modular control cabin; and a modular vector drive system. The modules may be arranged in a variety of formats on the deck of a laying vessel and the control cabin may if required be stacked on one of the other modules. Most preferably there is a separate vector drive module for each modular linear cable laying engine.

Preferably there is provided control means to maintain a constant pressure on the repeater housing.

Preferably the endless belts are each provided with a plurality of rollers to hold the opposed faces each in contact with opposite sides of a cable or with opposite sides of a repeater housing.

The invention will now be described by way of example only with reference to the following drawings in which.

FIGS. 2(a) through 2(d) schematically illustrate passage of a repeater housing through the linear cable laying engine of the present invention.

FIGS. 3(a) through 3(e) schematically illustrate the passage of a repeater housing through an alternate embodiment of a cable laying engine according to the present invention.

Figure 4:
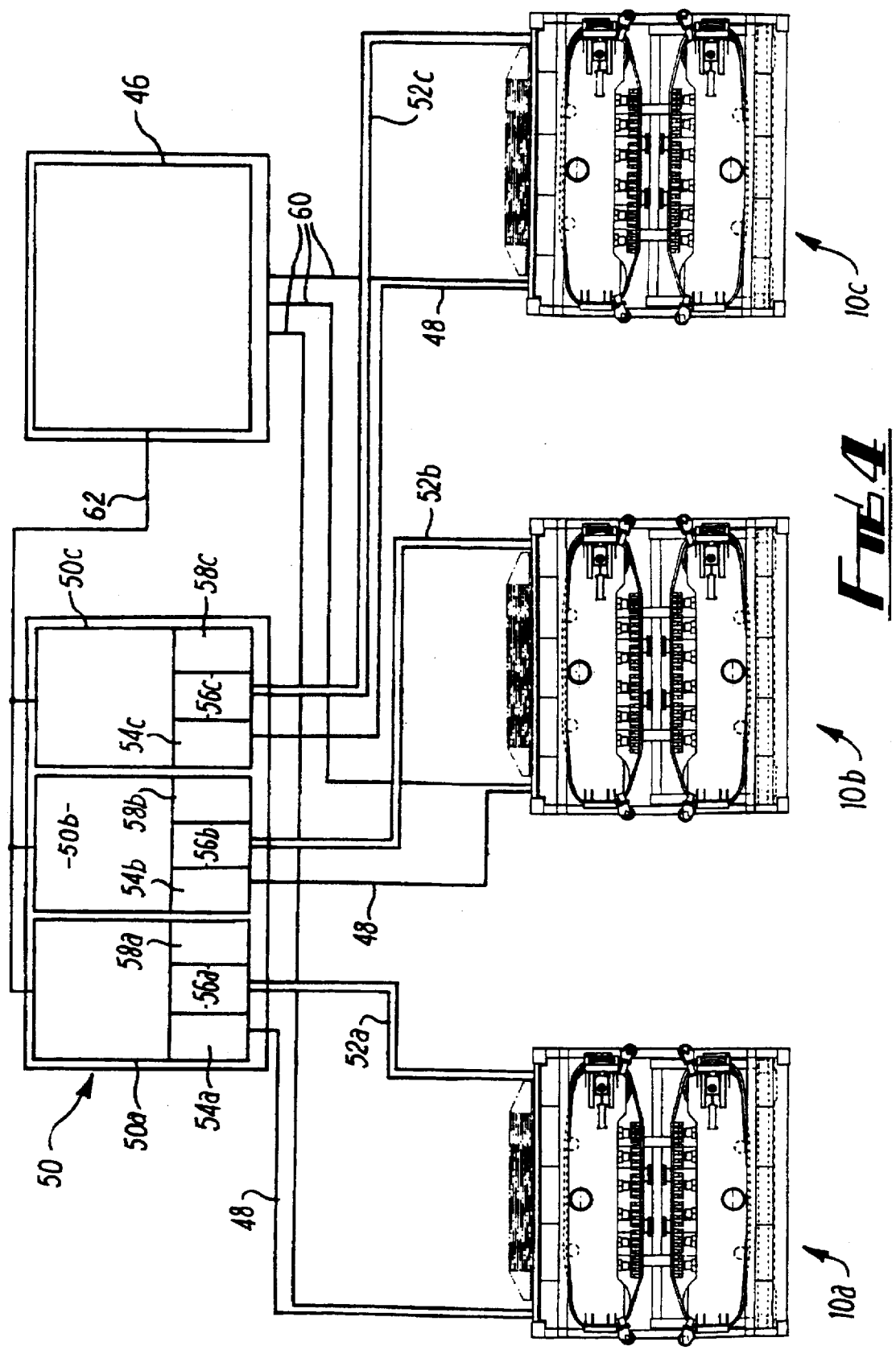

FIG. 4 is a front elevational view partially in schematic form illustrating a modular cable laying system according to the present invention comprising three linear cable engines, a control module and three vector drive module.

Figure 1A:
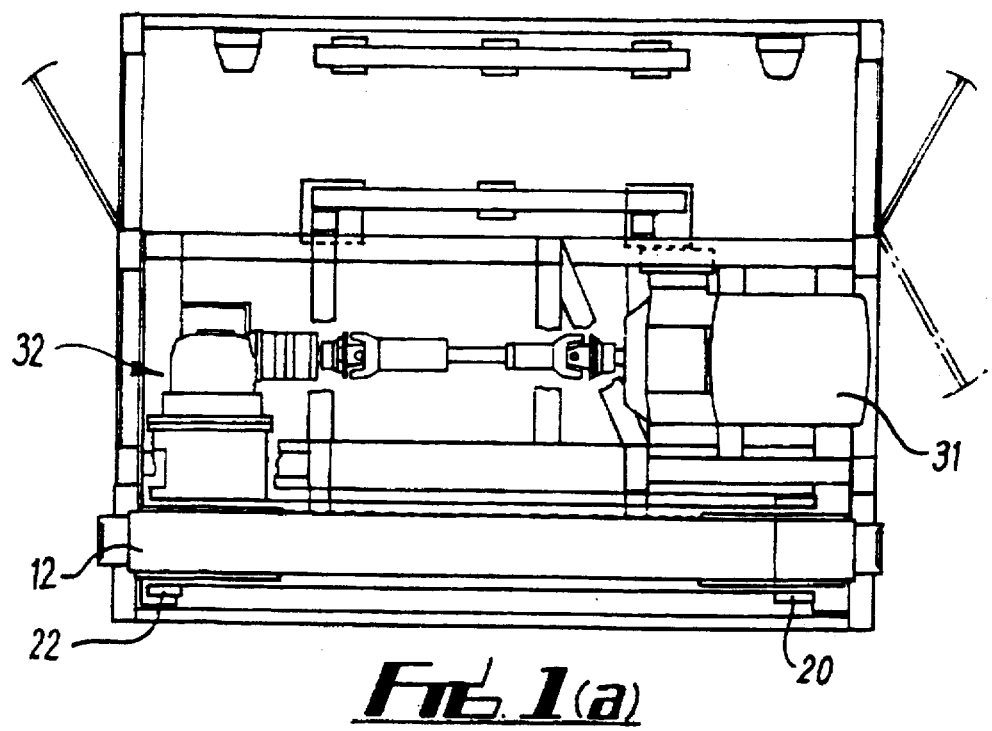
FIG. 1(a) is a plan view of a linear cable laying engine according to the present invention.

In FIG. 1, a cable engine indicated generally as reference 10 comprises upper and lower endless rubber belts 12, 14 each having a substantial length 16, 18 in face to face opposition; the opposed lengths 16, 18 are shown spaced apart in the Figure.

The belts 12, 14 are mounted on end pulleys 20, 22. Adjacent the end pulleys 20 are respective idler rollers 24. Respective hydraulic cylinders 26 operate to apply force to the idler rollers 24 and thereby tension the belts 12, 14.

The opposed length 16 of the upper belt 12, is backed by six groups of four back-up rollers 28a, 28b, 28c, 28d, 28e, 28f; each group of rollers is supplied with hydraulic force by a squeeze ram 30a, 30b, 30c, 30d, 30e, 30f supplied by one of two hydraulic powerpacks 32. Each group is thus movable independently of the others.

A similar arrangement applies to the lower belt 14. When hydraulic force is applied, the opposed faces of the belts 12, 14, are squeezed together and grip the cable between them.

The upper belt 12 with its back-up rollers 28, idle rollers 24 etc is attached to a pivot point 34, and the lower belt 14 is similarly attached to a pivot point 36. Both endless belts 12, 14 are further supplied with transverse movement means allowing them to be moved towards and away from the cable path so that the spacing between the belts can be varied.

The belts 12, 14 and their hydraulic driving arrangements etc are contained within a base frame 40 which conforms to standard 10 feet ISO container dimensions and has conventional twist lock connectors (not shown) by which it can be locked to a ship's deck. The base frame has removable front and side panels (not shown) to give protection during transport and allow easy access during operation.

Figure 1B:
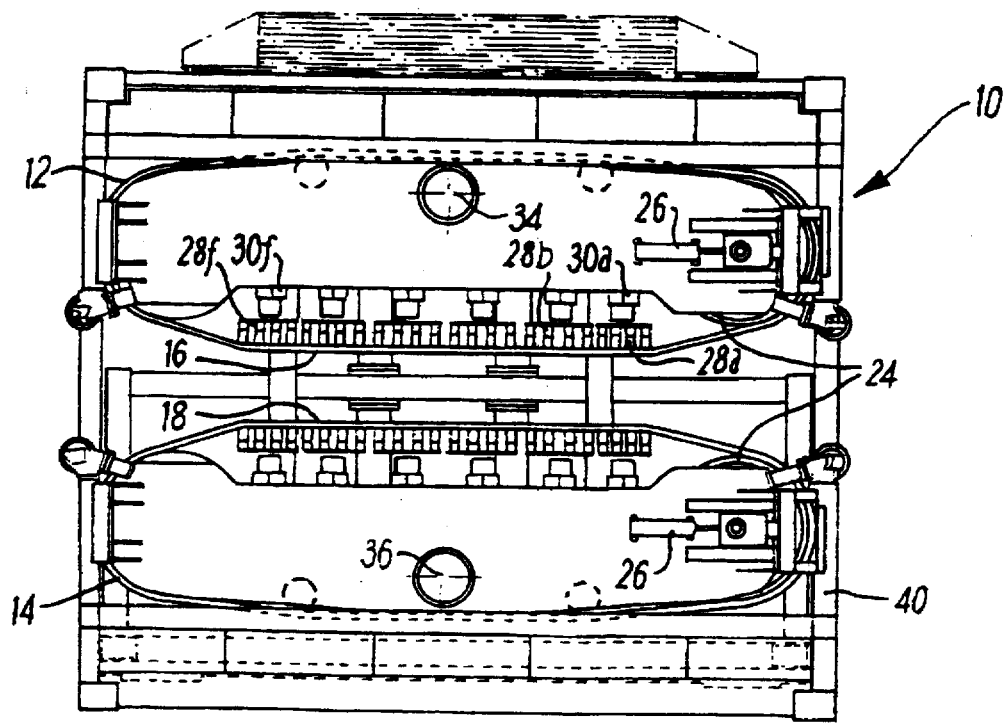
FIG. 1(b) is an elevational view of the cable laying engine of FIG. 1(a).

The base frame also contains two electric motors, one to drive each belt 12, 14. One motor 31 is shown in FIG. 1; both are conventional in construction and are located behind the respective belts in the FIG. 1(b) view. Lying behind these two motors, is a hydraulic accumulator and associates further electric motor, which together form an hydraulic power pack 32 for the cable engine 10.

The motors are independently operable but are synchronised for speed and torque by a drive control system (see below). The motors drive the endless belts via a cardan shaft and two stage epicyclic gearbox (not shown).

FIGS. 2 and 3 illustrate, schematically, the passage of an undersea cable repeater housing through respective embodiments of cable laying engines according to the invention. In FIG. 2 this is illustrated in four stages, while in FIG. 3 this is illustrated in five stages (a) to (e).

In normal use, the upper and lower belts 12, 14 mounted on base frame 40 grip a cable 42 between their opposed faces. The belts are spaced to give the appropriate level of force on cable 42.

In FIG. 2(b) the belts 12,14 on a first or front module engine are caused to open to allow the unobstructed passage of the repeater housing 44. When the repeater 44 has passed through the first module, the belts of that module close and immediately thereafter the belts of the second module open (as shown in FIG. 2(c)) allowing the cable to be gripped continually, while also ensuring that the passage of the repeater continues without interference. Sensors (not shown) may be used to sense the approach of a repeater and cause the timely transverse movement of the belts.

Figure 3A:
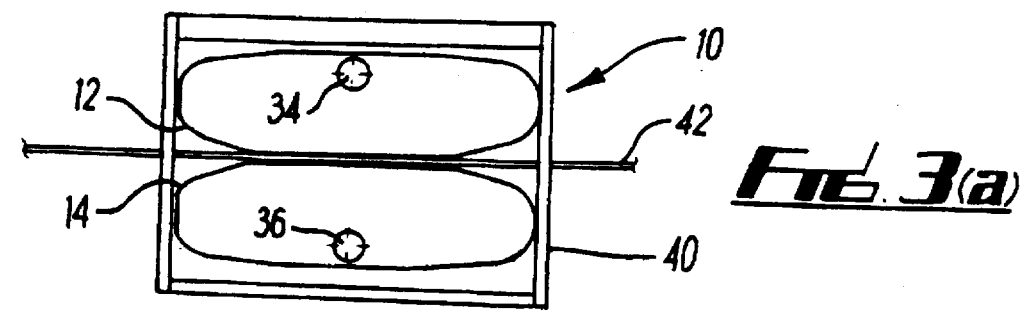
Figure 3B:
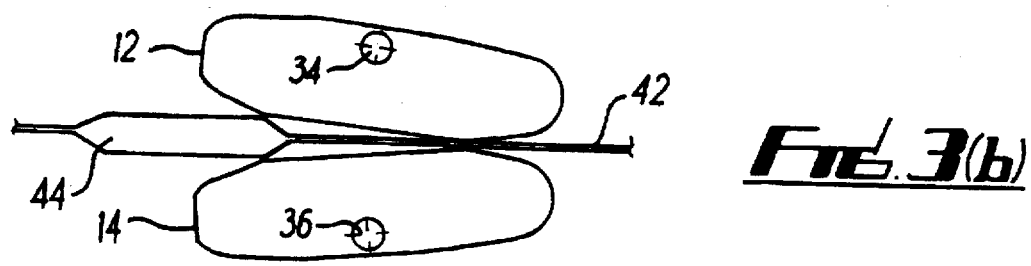

In an alternative engine, as shown in part in FIG. 3(b), when a repeater housing 44 on the cable 42 reaches the end of the belts, the upper belt 12 is pivoted about pivot point 34 and the lower belt 14 is pivoted about pivot point 36 while both belts are moved transversely away from the cable to provide a tapered gap between the opposed faces so as to allow passage of the repeater housing. The pivotal movements are caused by hydraulic cylinders (not shown) supplied with hydraulic power by the hydraulic power pack 32 (not shown in this figure) which also supplies the hydraulic power to control belt spacing.

Figure 3C:
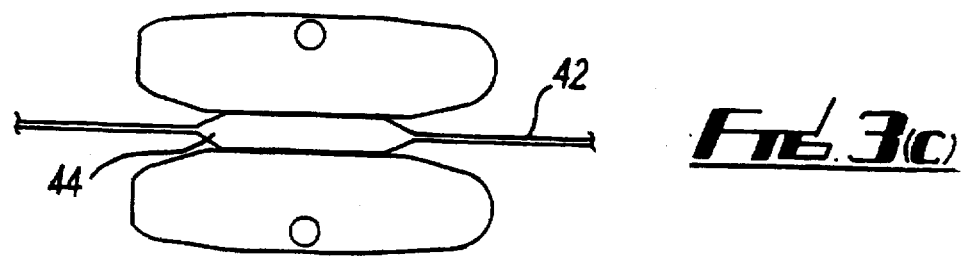

As the housing 44 is moved through the cable engine to the position shown in FIG. 3(c), the pivotal movements of belts 12, 14 are reversed so that the opposed faces are again parallel, but spaced at a greater distance so as to accommodate the housing.

Figure 3D:
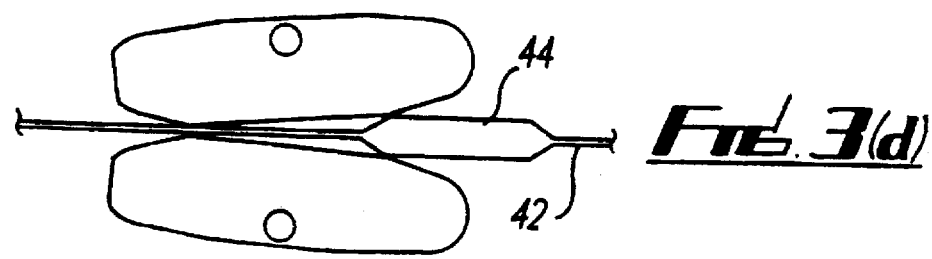

As the housing 44 passes out of the cable engine, FIG. 3(d) the belts 12, 14 are again pivoted about their respective pivot points, to provide a tapered gap, allowing the repeater 44 to the gripped at one end of the engine while the cable 42 is gripped at the other end.

Figure 3E:
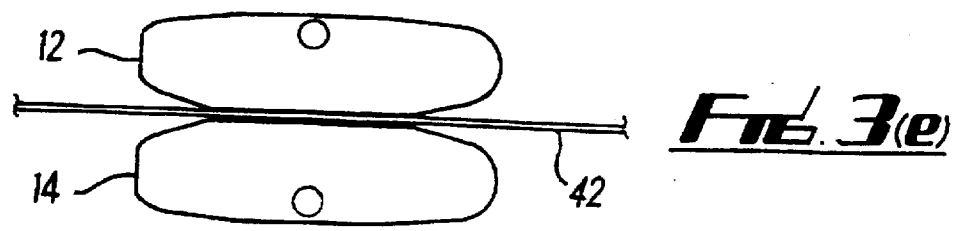

Finally, as shown in FIG. 3(e), the housing passes completely through and the pivotal and transverse movements are reversed and the opposed faces of the belts 12, 14 grip the cable 42 once more.

The positions of the independently movable roller groups of the cable engines may also be adjusted during passage of the housing.

A further configuration in accordance with the invention provides the belts with a plurality of rollers to hold the opposed faces each in contact with opposite sides of the cable or repeater housing. The rollers act independently to allow the belts to conform to the shape of the repeater housings as they pass through.

It is a great advantage of these arrangements according to the invention that the cable laying vessel can continue to travel at a constant or near constant speed while a repeater housing is fed out or pulled in. This is in marked contrast to current arrangements in which disconnection of the cable-laying equipment and slowing of the vessel are necessary to permit manual handling of the repeater housing.

The use of an accumulator-based hydraulic power pack (32, see FIG. 1) has the advantage that when the repeater housing reaches the edge of the endless belts, they are forced apart and fluid flows into the accumulator. As the repeater housing moves out of the cable engine, the pressurised fluid flows back to maintain pressure on the cable. Also, if there is power failure, the accumulator maintains the grip on the cable.

The pivotal movements of the endless belts and their relative transverse movements are also hydraulic-controlled.

In the modular cable laying system shown in FIG. 4, three linear cable engines 10a, 10b, 10c, each having the format described in detail with reference to FIG. 1, are arranged so that the cable (not shown) can pass through them in series.

A modular control cabin 46 is shown connected by electrical connections 60 to each cable engine 10a, 10b, 10c, and respective vector drive system modules 50a, 50b, 50c are shown connected by electrical connections 48 to each cable engine. The control cabin 46 and vector drive modules 50a, 50b, 50c are also connected by electrical connections 62.

Physically the vector drive modules 50a, 50b, 50c are provided within ISO container frames, and are positioned adjacent to or even on top of cable engine modules 10a, 10b, 10c the electrical connections are shown schematically.

The control cabin module 46 contains electrical control systems, usually software-based, which are capable of operating up to five linear cable engines. In each arrangement, the number of engines, the belt speeds and the gripping pressures are controlled in accordance with cable diameter and required laying speed. If two or three cable engines are provided, the control systems operate so that the engines function and respond as a single unit; the tension is actively controlled so that it is shared equally, and the speeds of the engines are equalised. The control cabin module is also provided within an ISO container frame, which would normally be positioned in line with the vector drive modules 50a, 50b, 50c. In FIG. 3 it is shown above the drive modules purely for convenience of illustration.

The control cabin will usually contain a computer, visual display unit (VDU), and ancillary equipment required to operate up to five linear cable engines including signal conditioning analog to digital input to output cards and servo cards. The VDU may give a menu-format display for control of the cable laying or cable pick-up operation.

The vector drive modules each contain a vector drive control unit 52a, 52b, 52c for each respective linear cable engine. The systems balance the speed and torque of the upper and lower belts.

Each drive control module 50a, 50b, 50c also contains an auxiliary drive control unit 54a, 54b, 54c and an air conditioning unit 56a, 56b, 56c to regulate the air temperature inside the modules. Each drive control module further includes a water heater/cooler 58a, 58b, 58c contained within a separate interior compartment for regulating the temperature of the vector drive resistors (not shown). The heaters/coolers use seawater as a cooling fluid and an immersion heater to regulate the temperature of a fresh water supply which in turn regulates the temperature of the resistors.

When the vessel carrying a cable laying system is travelling through the ocean, the belts 12, 14 gripping the cable are straining against the motion of the shop and are releasing the cable out, not driving it out. The belts therefore provide reverse drive to their respective vector motors as a continuous braking effect results.

The vector drive control units are each provided with a bank of resistors (not illustrated). The resistors are switched in steps by the control system in control module 46 to ensure that electrical power is not regenerated back to the external supply. The temperature of the resistors is regulated by the water heaters/coolers 58. Warmed seawater may either be used to heat the ship or be discharged.

The linear cable engines are controlled so that no slack cable is developed between each module with zero to maximum outboard tension. This also applies during the passage of a repeater at low cable tension. This is achieved by driving out on the outboard module and braking with all other inboard cable engines to preset inter-module tensions.

It is an advantage of the arrangements disclosed above that a modular cable laying system can be quickly and easily installed on a ship having standard container deck sockets. When not in use, it can be removed for dockside storage.

The ability to handle repeater housings automatically permits the vessel to maintain a steady speed and a continuous outboard tension. The ability to run two or more linear cables in series allows a rapid change of cable size or laying speed, and the hydraulic squeeze of the cables can be set to minimise cable damage. The software control maximises the flexibility and allows the system to be menu-driven.

The advantage of use of a vector drive is that the laying speed is infinitely variable from zero, and that torque control is infinitely variable from stall.

We claim:

1. A linear cable laying engine comprising a pair of endless belts each having a substantial length in respective face to face opposition for gripping a cable, and means for causing the position of the belts with respect to the cable to be periodically adjusted for allowing clear and uninterrupted passage of a housing on the cable through the belts while maintaining tension on the cable.

2. A linear cable laying engine as claimed in claim 1, the engine being modular and adapted to be conjoined to other cable laying engines to form a linear cable laying system.

3. A linear cable laying engine as claimed in claim 1, wherein the means includes one or more hydraulic cylinders arranged to apply force to the belts.

4. A linear cable laying engine as claimed in claim 1, which further includes a base frame.

5. A linear cable laying engine as claimed in claim 4, wherein each base frame also contains an hydraulic power pack to supply hydraulic power, and electric drive means to drive the belts.

6. A linear cable laying engine as claimed in claim 5, which further comprises a pivotal support means for at least one endless belt whereby the at least one belt can pivot to form a tapering aperture between the opposed lengths of belt.

7. A linear cable laying engine as claimed in claim 1, wherein one or more of the endless belts are supplied with transverse movement means so that the spacing between the opposed lengths can be varied.

8. A plurality of modular linear cable laying engines in accordance with claim 1 arranged to operate on a cable in series; and control means to control the hydraulic and electric power supplied to each engine so as to balance the loading applied to each.

9. A linear cable laying engine as set forth in claim 1, further comprising a vector drive control system arranged to provide braking power to the endless belts in accordance with the speed of movement of the vessel and the required cable laying speed.

10. A linear cable laying engine as claimed in claim 9, wherein the vector drive control system is arranged to regenerate power during the braking mode and is connected to a plurality of resistors to which such regenerated power is supplied.

11. A modular cable laying system comprising at least one modular linear cable laying engine; a modular control cabin; and a modular vector drive system; and in which the at least one modular linear cable laying engine comprises a pair of endless belts each having a substantial length in respective face to face opposition for gripping a cable; and means for causing the position of the belts with respect to the cable to be periodically adjusted for allowing clear and uninterrupted passage of a housing on the cable through the belts while maintaining tension on the cable.

12. A system as claimed in claim 11, wherein there is a separate vector drive module for each modular linear cable laying engine.

13. A system as claimed in claim 11, wherein there is provided control means to maintain a constant pressure on a repeater housing passing through the belts.

14. A system as claimed in claim 11, wherein the endless belts are each provided with a plurality of rollers to hold the opposed faces each in contact with opposite sides of a cable or with opposite sides of a repeater housing.

* * * * *